(12) United States Patent
Barr et al.

(10) Patent No.: US 10,749,701 B2
(45) Date of Patent: Aug. 18, 2020

(54) IDENTIFICATION OF MEETING GROUP AND RELATED CONTENT

(71) Applicant: Microsoft Technology Licensing, LLC, Redmond, WA (US)

(72) Inventors: Paul C. Barr, Carnation, WA (US); Isaiah Ng, Bellevue, WA (US); Alyssa A. Dunn, Seattle, WA (US); Kiran Kumar, Redmond, WA (US); Michael C. Hilsdale, Sammamish, WA (US); Gordon George Free, Freeland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 106 days.

(21) Appl. No.: 15/712,620

(22) Filed: Sep. 22, 2017

(65) Prior Publication Data

US 2019/0097824 A1  Mar. 28, 2019

(51) Int. Cl.
| | | |
|---|---|---|
| G06F 15/16 | (2006.01) | |
| H04L 12/18 | (2006.01) | |
| G06Q 50/00 | (2012.01) | |
| G06Q 10/10 | (2012.01) | |
| H04L 29/08 | (2006.01) | |

(52) U.S. Cl.
CPC ......... H04L 12/1822 (2013.01); G06Q 10/10 (2013.01); G06Q 10/1095 (2013.01); G06Q 50/01 (2013.01); H04L 12/1818 (2013.01); H04L 67/306 (2013.01)

(58) Field of Classification Search
CPC ............. H04L 12/1822; H04L 12/1818; H04L 67/306; G06Q 10/10; G06Q 10/1095; G06Q 50/01

USPC ................................................... 709/204, 224
See application file for complete search history.

(56) References Cited

U.S. PATENT DOCUMENTS

| | | |
|---|---|---|
| 6,894,703 B2 | 5/2005 | Vernier et al. |
| 7,167,142 B2 | 1/2007 | Buckley et al. |
| 8,589,806 B1 | 11/2013 | Sena |
| 8,974,303 B2 | 3/2015 | Mercuri et al. |
| 2005/0183035 A1 | 8/2005 | Ringel et al. |

(Continued)

FOREIGN PATENT DOCUMENTS

| | | |
|---|---|---|
| WO | 2014/178800 A1 | 11/2014 |
| WO | 2016144921 A1 | 9/2016 |

OTHER PUBLICATIONS

"International Search Report and Written Opinion Issued in PCT Application No. PCT/US2018/039209", dated Sep. 10, 2018, 12 pages.

(Continued)

*Primary Examiner* — Philip B Tran
(74) *Attorney, Agent, or Firm* — Fiala & Weaver P.L.L.C.

(57) ABSTRACT

Methods, systems, and apparatuses are described here that identify meeting content. A meeting content determiner in a shared computing device identifies a group including two or more participants in a meeting, where at least one participant of the group is logged into an account associated with a meeting content determiner. Further, the meeting content determiner identifies content associated with the two or more participants, and accessible by the at least one participant logged into the account and displays indications of the identified content to one or more participants of the group.

20 Claims, 5 Drawing Sheets

(56) References Cited

U.S. PATENT DOCUMENTS

| | | | |
|---|---|---|---|
| 2007/0124370 A1 | 5/2007 | Nareddy et al. | |
| 2009/0132519 A1* | 5/2009 | Rathod | G06F 16/48 |
| 2011/0185437 A1 | 7/2011 | Tran et al. | |
| 2013/0157693 A1* | 6/2013 | Mercuri | H04W 4/21 |
| | | | 455/456.3 |
| 2013/0212494 A1* | 8/2013 | Heiferman | G06Q 10/1095 |
| | | | 715/753 |
| 2013/0268591 A1* | 10/2013 | Chen | G06Q 50/01 |
| | | | 709/204 |
| 2014/0229289 A1 | 8/2014 | Rao et al. | |
| 2015/0142886 A1 | 5/2015 | Berry et al. | |
| 2015/0248651 A1* | 9/2015 | Akutagawa | G06Q 10/1095 |
| | | | 705/7.19 |
| 2015/0249669 A1* | 9/2015 | Gamage | H04L 63/10 |
| | | | 726/26 |
| 2015/0304369 A1* | 10/2015 | Sandholm | G06Q 10/10 |
| | | | 715/753 |
| 2016/0048932 A1 | 2/2016 | Mcnelley et al. | |
| 2016/0323333 A1* | 11/2016 | Aggarwal | G11B 27/00 |
| 2017/0039527 A1* | 2/2017 | Rangan | G06Q 10/1095 |
| 2017/0323340 A1* | 11/2017 | Jeon | G06Q 30/0261 |
| 2018/0124129 A1* | 5/2018 | Geisler | H04L 67/306 |

OTHER PUBLICATIONS

Brignull, et al., "The Introduction of a Shared Interactive Surface Into a Communal Space", In Proceedings of ACM conference on Computer Supported Cooperative Work, Nov. 6, 2004, 10 pages.

Brinck, et al., "A Collaborative Medium for the Support of Conversational Props", In Proceedings of ACM Conference on Computer Supported Cooperative Work, Nov. 1, 1992, 9 pages.

Shen, et al., "UbiTable: Impromptu Face-to-Face Collaboration on Horizontal Interactive Surfaces", Merl—A Mitsubishi Electric Research Laboratory, Sep. 2003, 10 pages.

Rogers, et al., "Collaborating Around Vertical and Horizontal Large Interactive Displays: Which Way is Best?", In Journal of Interacting with Computers, vol. 16, Sep. 15, 2004, pp. 1133-1152.

Bajarin, Ben, "The Family Tablet: How New Devices Foster Communal Computing", retrieved from <http://techland.time.com/2012/10/15/the-family-tablet-how-new-devices-foster-communal-computing/>, Published on: Oct. 15, 2012, 2 pages.

Sampson, Michael, "Screenhero—Multi-Person Collaborative Screen Sharing", retrieved from <https://michaelsampson.net/2013/02/21/screenhero/>, Published on: Feb. 21, 2013, 1 page.

* cited by examiner

402 — Retrieve weight indications for the identified content from a graph representing accesses to content by the two or more participants

502 — Arrange the displayed indications of the identified content on a display screen based on the weight indications

602 — Update the graph to reflect a participant of the group accessing the identified content

604 — Update the displayed indications of the identified content based on the update to the graph

702 — Filter the displayed indications of the identified content based on at least one of content type, content source, or participants in the group

IDENTIFICATION OF MEETING GROUP AND RELATED CONTENT

BACKGROUND

Various tools exist that enable users to collaborate and to share documents. For example, conferencing tools like Microsoft Skype® and Cisco WebEx® enable users to conduct voice and video web conferences, and to share and collaborate on documents during the web conferences. Moreover, document generation and search tools are available that enable users to create documents and search through them. For example, Microsoft Word® enables a user to generate and search word processing documents, Microsoft Outlook® enables a user to generate and search email, Dropbox® enables a user to store and search on stored documents, a file explorer tool may enable a user to search over a variety of stored document types in a directory structure, etc. During a web conference conducted by a conferencing tool, a user may use a search tool to find documents to show and/or share during the web conference.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for identifying meeting content. A meeting content identifier in a shared computing device identifies a group including two or more participants in a meeting. One or more participants of the group are logged into accounts associated with a meeting managing application. The meeting content determiner identifies content associated with the two or more participants, that is accessible by the logged in participant(s), and displays indications of the identified content to one or more participants of the group.

Further features and advantages of the invention, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Various tools exist that enable users to collaborate and to share documents. For example, conferencing tools like Microsoft Skype® and Cisco WebEx® enable users to conduct voice and video web conferences, and to share and collaborate on documents during the web conferences. Moreover, document generation and search tools are available that enable users to create documents and search through them. During a web conference conducted by a conferencing tool, a user may use a search tool to find documents to show and/or share during the web conference. However, such tools are largely ineffective in surfacing content contained in communications such as emails, text messages, and chat conversations between people involved in a project. Furthermore, such tools are not capable of assisting users in picking up where a prior meeting between the users left off, including being ineffective at identifying content shared and/or otherwise related to the prior meeting, for use in a subsequent meeting between the users. As such, conventional tools are not helpful at allowing users to quickly get into the context of initiated meetings.

Embodiments relate to collaborative, multi-user products that may function as a communal or shared computing device enabling multiple users to quickly and effortlessly resume working on a project from the point where they had previously stopped working on the project. For instance, embodiments are described herein directed to a shared computing device that enables users to quickly and effortlessly start or resume working on projects and tasks during interactions and meetings by automatically identifying and presenting content relevant to the meeting to the users. In an embodiment, a shared computing device correlates interactions between users, stores these interactions, and uses the stored interaction information to identify content relevant to a meeting. Each interaction enables the shared computing device to continually present more and more relevant content to the users of the shared computing device.

Embodiments connect sources, such as Microsoft® Office 365®, Microsoft® Exchange®, Microsoft® Teams, Slack® by Slack Technologies, Dropbox®, etc., and presents them in a user-centered interface that enables users to quickly find content, including conversations, related to another person or groups of persons. Embodiments become smarter over time by correlating interactions between different users and storing them in the user account and/or an activity graph (a data structure the indicates the interactions between content and people) so that subsequent interaction with a shared computing device present even more relevant information. Embodiments support multiple people to be signed in to a shared computing device, and supports 3rd party integration using public APIs.

Embodiments enable various features, including: accessing content on a large screen shared computing device; multiple signed-in users to access content on the same system simultaneously; automatically suggesting relevant content for a group of "identified people" using the device based on signals from a team roster (a predetermined list of users who belong to a team registered to the device), scheduled meeting invite, online meeting, nearby laptops/phones, facial recognition, etc.; machine learning to improve content suggestions for a group of people by associating file activity with a weighted set of "identified people"; automatically roaming file activity on the shared computing device to the signed-in user(s)' account, allowing them to resume activities on their device later; roaming frequent network share folders from a personal device to the shared computing device, allowing users to quickly access documents from network shares; enabling 3rd party cloud services to provide additional content sources via a plugin model, thereby increasing the potential user base; and supporting intelligent content access even for on-premises environments, thereby increasing a potential user base. Further, embodiments enable the determination of content to suggest to identified people of a meeting based on one or more of numerous factors described herein or elsewhere known, such as whether one or more of the identified people viewed, modified, and/or created particular content, whether they viewed content together previously on a shared computing device, and/or whether the content was associated with a meeting that includes one or more identified people.

Figure 1:
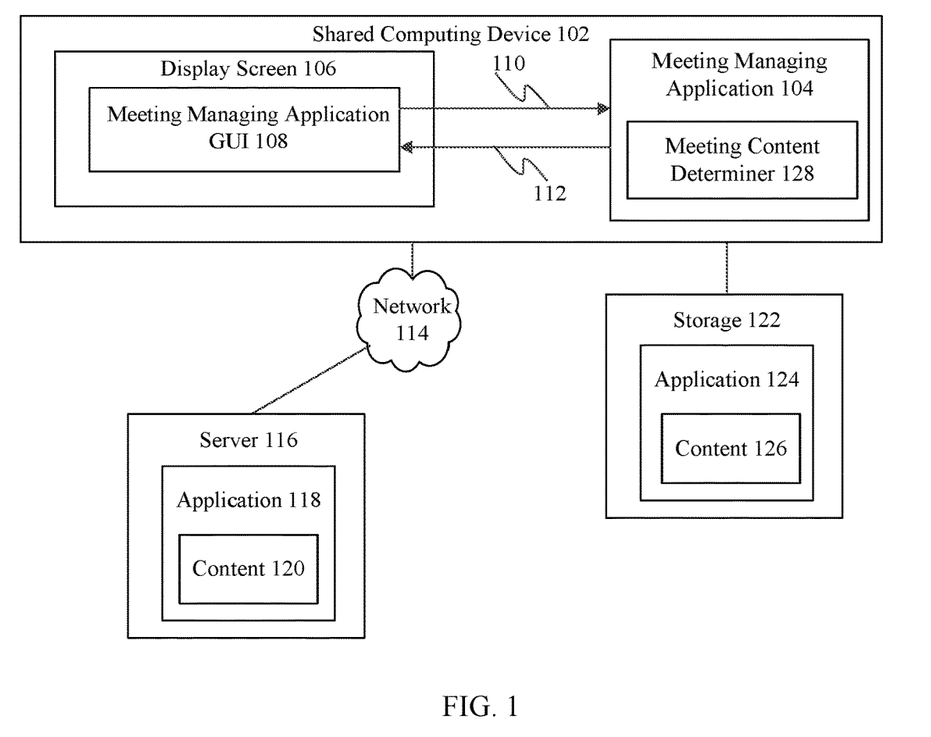
FIG. 1 shows a block diagram of a meeting system that enables identification of a meeting group and related content, according to an example embodiment.

Accordingly, example embodiments are described herein directed to shared computing devices and the identification of relevant meeting content. For instance, FIG. 1 shows a block diagram of a meeting system 100 that enables identification of a meeting group and related content, according to an example embodiment. As shown in FIG. 1, system 100 includes a shared computing device 102, a server 116, and storage 122. Shared computing device 102 includes a meeting managing application 104 and a display screen 106. Server 116 includes an application 118, and storage 122 stores an application 124. A network 114 communicatively couples shared computing device 102 and server 116. Meeting managing application 104 includes a meeting content determiner 128. System 100 is described in further detail as follows.

Shared computing device 102 may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer). In an embodiment, shared computing device 102 may be a computing device configured as a communal device for operation and interaction by multiple users simultaneously. Such a communal device may be wall-mounted, may have a display that forms a tabletop, may be mounted on a roller-stand, may be an "interactive whiteboard," and/or may be another type of computing device that is not capable of being handheld due to large size and/or weight (e.g., having a display diagonal length of 40 inches or greater). A communal device may be configured to be used simultaneously by one or more people in a meeting, may include one or more touchscreens allowing multiple users to interact with it simultaneously, and an operating system that supports multiple identified and authenticated users. Examples of communal devices include the Microsoft® Surface Hub™, the Google® Jamboard™, etc. Server 116 may include one or more server devices and/or other computing devices.

Shared computing device 102 and server 116 may include at least one network interface that enables communications over network 114. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of network 114 include a local area network (LAN), a wide area network (WAN), a personal area network (PAN), and/or a combination of communication networks, such as the Internet.

Application 118 stored in server 116 is an example of a network-based application, also referred to as a "cloud" application or service. Application 118 is accessible by computing device 102 over network 114, and may be configured to perform data processing and/or data hosting operations. Application 118 has associated content 120. Content 120 is accessible by meeting managing application 104 over network 114. For example, application 118 may have an application programming interface (API) (e.g., public facing API) that meeting managing application 104 may communicate with to access content 120. Application 118 may be any type of web accessible application/service, such as database application, social networking application, messaging application, financial services application, news application, search application, web-accessible productivity application, cloud storage and/file hosting application, etc. Examples of such applications include a web-accessible SQL (structured query language) database, Salesforce.com™, Facebook®, Twitter®, Instagram®, Yammer®, LinkedIn®, Yahoo!® Finance, The New York Times® (at www.nytimes.com), Google search, Microsoft® Bing, Google Docs™, Microsoft® Office 365, Dropbox®, etc. Although FIG. 1 shows a single network-based application, any number of network-based applications may be accessible by meeting managing application 104 over network 114, including numbers of applications in the tens, hundreds, thousands, or greater numbers.

Storage 122 may include one or more of any type of storage mechanism, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium. Application 124 in storage 122 is an example of a local application accessible by shared computing device 102 without communicating over a network, and may be configured to perform data processing and/or data hosting operations when executed by a processor of shared computing device 102. As shown in FIG. 1, application 124 has associated content 126. Content 126 may be accessible by meeting managing application 104 via an API and/or in any other manner. Application 124 may be any type of local application/service, such as a database application (e.g., QuickBooks®, a Microsoft® Excel® spreadsheet), a messaging application (e.g., Microsoft® Outlook®), a productivity application (e.g., Microsoft® Word®, Microsoft® PowerPoint®, etc.), or another type of application. Although FIG. 1 shows a single local application, any number of local applications may be present at computing device 102 and accessible by meeting managing application 104, including numbers in the tens, hundreds, or greater numbers.

Note that content 120 and content 126 may each include any type of content, including audio files, image files, presentation files (e.g., Microsoft® PowerPoint® presentations), spreadsheet files formats (e.g., Microsoft® Excel® spreadsheets), word processor and text files (Microsoft® Word® file), video files, compressed files (e.g., Zip® compressed file), emails, chat conversations, posts on social media (e.g., Facebook®) and cloud-based collaboration tools and services (e.g., Slack®), programming files (e.g., C++ source code file), web pages, and/or any other type of content generated by, maintained by, and/or otherwise accessible by applications 118 and 124.

Meeting managing application 104 is configured to enable users to conduct meetings, such as by enabling communications between the participating users, the display/presentation of content to the participants, etc. As shown in FIG. 1, meeting managing application 104 includes meeting content determiner 128. Meeting content determiner 128 is configured to determine meeting content for a meeting between participants.

For instance, a participant of a meeting may interact with meeting managing application 104 at shared computing device 102 to initiate a meeting. The participant may be authenticated by logging into an account associated with meeting managing application 104. For example, the participant may enter a username and password into text entry boxes presented to the participant by a meeting managing application graphical user interface (GUI) 108 displayed on display screen 106 of shared computing device 102. The login information may be used to authenticate the user in any manner, conventional or otherwise. Alternatively, the participant may be authenticated or logged in in other ways, such as by proximity of a computing device (e.g., a smart phone, a tablet, a laptop, etc.) of the participant to shared computing device 102, by computing device 102 (or associated device) performing face recognition, voice recognition, fingerprint scanner and/or any other biometric and/or other information that may be used for authentication. In embodiments, more than one participant can be authenticated to interact with meeting managing application 104 at a same time (or at different times). In other embodiments, one or more participants may be remotely located from shared computing device 102 at corresponding computing devices, and may interact in the meeting managed by meeting managing application 104 over network 114.

The one or more participants may be enabled to interact with meeting managing application 104 through meeting managing application GUI 108 to engage in the meeting. Furthermore, a participant may interact with meeting content determiner 128 through GUI 108 to initiate a determination of content associated with the participants. Alternatively, meeting content determiner 128 may automatically determine content associated with the meeting participants without prompting by a participant. For instance, meeting content determiner 128 may be configured to automatically determine content at the time the meeting is commenced (e.g., at an appointed time, when multiple participants are present, etc.), and/or after the meeting has commenced at one or more predetermined times, periodic times, and/or other times, such as each time one or more participants join or leave the meeting.

Meeting content determiner 128 may initiate a search for the related content in an automatic or directed manner. For instance, as shown in FIG. 1, meeting content determiner 128 may receive input information 112 at meeting managing application GUI 108. Input information 112 may include an instruction (received from any identified participant and/or parsed from meeting-related information) to search for content, which may include any content associated with the meeting participants (e.g., searching for content related to a context of the meeting, such as content that is indicated by one or more keywords indicated by words in the meeting title and/or elsewhere). The searched for content may be accessible by one or more of the logged-in participant(s) by meeting managing application GUI 108. The content may be considered accessible if one or more meeting participants have permission to access (e.g., to open, view, and/or modify) the content, if the content is not indicated as private, etc.

Meeting content determiner 128 generates identified content information 110, which may be displayed by GUI 108. Identified content information 110 includes indications of content identified by meeting content determiner 128 based on the search, and may indicate the identified content in any manner, including by title, by hyperlink, by one or more keywords, by a snippet, and/or by any further identifying information. In the example of FIG. 1, if content 120 and 126 are both identified by meeting content determiner 128 as relevant to participants of a meeting, identified content information 110 may be generated to include indications of content 120 and 126, and a participant may be enabled to access content 120 and 126 by clicking on the corresponding displayed indications of content 120 and 126 in GUI 108.

Figure 2:
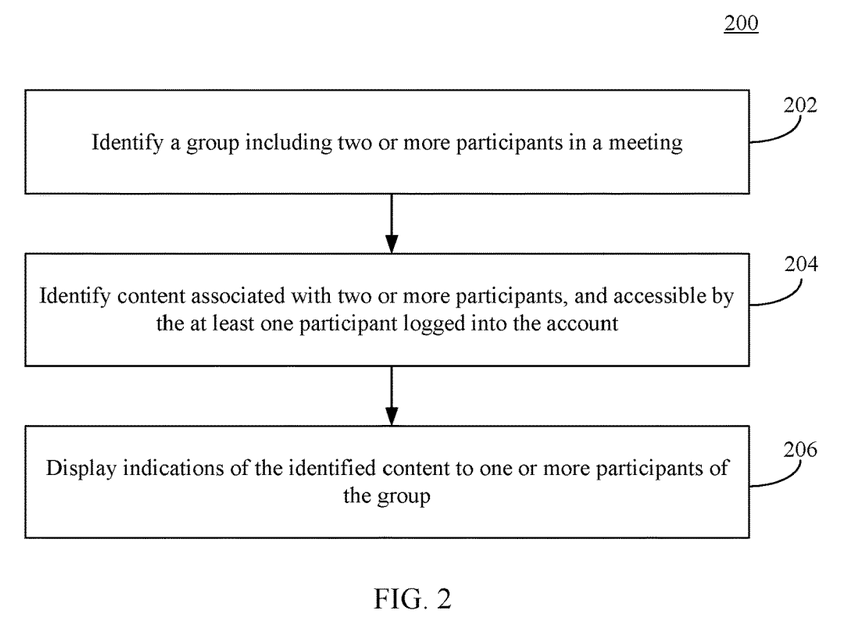
FIG. 2 shows a flowchart providing a process for identifying a meeting group and related content, according to an example embodiment.

Meeting content determiner 128 may operate in various ways to determine meeting content. For instance, in embodiments, meeting content determiner 128 may operate according to FIG. 2. FIG. 2 shows a flowchart 200 providing a process for identifying a meeting group and related content, according to an example embodiment. FIG. 2 is described with continued reference to FIG. 1. Other structural and operational embodiments will be apparent to persons skilled in the relevant art(s) based on the following discussion regarding flowchart 200 and system 100 of FIG. 1.

As shown in FIG. 2, the method of flowchart 200 begins at step 202. In step 202, a group is identified that includes two or more participants in a meeting. For example, and with continued reference to FIG. 1, meeting content determiner 128 may identify a group including two or more participants in a meeting. In an embodiment, one or more of the participants of the group may be logged into an account associated with meeting managing application 104. The participants identified for the meeting include the one or more logged in users, and may additionally include one or more users identified as meeting participants using any suitable technique mentioned herein or otherwise known. For instance, the additional participants may be identified as invitees to a scheduled meeting, people who frequently work with each other, people in a messaging channel, people located in the same office, people identified when a meeting is held, by proximity of personal computing devices of one or more users to shared computing device 102, by facial recognition, by voice recognition, and/or by any other personal recognition technology that may be used to identify participants of a meeting. As described above, the meeting may optionally have a context (e.g., a topic, a subject matter, a purpose) that meeting content determiner 128 determines by identifying keywords, such as in a title and/or body of a meeting invitation, keywords input by one or more of the participants, by speech recognition (identifying keywords spoken by participants), by keywords of a prior meeting that included the one or more participants, from a comparison of account profile information for the participants, and/or in other ways.

At step 204, content is identified that is associated with the two or more participants, and is accessible by the at least one participant. For example, and with continued reference to FIG. 1, meeting content determiner 128 is configured to identify content associated with the two or more participants (and optionally with one or more keywords), and accessible by the at least one participant logged into the account. For instance, meeting content determiner 128 may be determined to perform searches on one or more content sources for content having attributes that match the keyword(s), such as content objects (e.g., files) having names and/or contents containing the one or more keywords (and optionally synonyms for the keywords). In one example, meeting content determiner 128 may search accessible folders (e.g., folders owned by the one or more participants) in storage 122 of shared computing device 102 for content containing one or more of the keywords. Additionally, or alternatively, meeting content determiner 128 may provide search requests (containing the keyword(s)) to one or more local and/or remote applications, such as application 124 and/or application 118, which may perform a search based on the search request on respective associated content, and may transmit responses to the search request that identify any matching content found. In an embodiment where the application is a messaging application (e.g., Microsoft Outlook®, a texting application, an instant messaging application, etc.), the identified content may include messages transmitted between the two or more participants of conversations that occurred prior to and/or during the meeting.

At step 206, indications of the identified content are displayed to one or more participants of the group. For example, and with continued reference to FIG. 1, meeting content determiner 128 may display indications of the identified content in GUI 108 on display screen 106 that one or more participants of the group may view and interact with. As described above, the indications may be selectable links, titles, snippets, etc., of the identified content.

Figure 3:
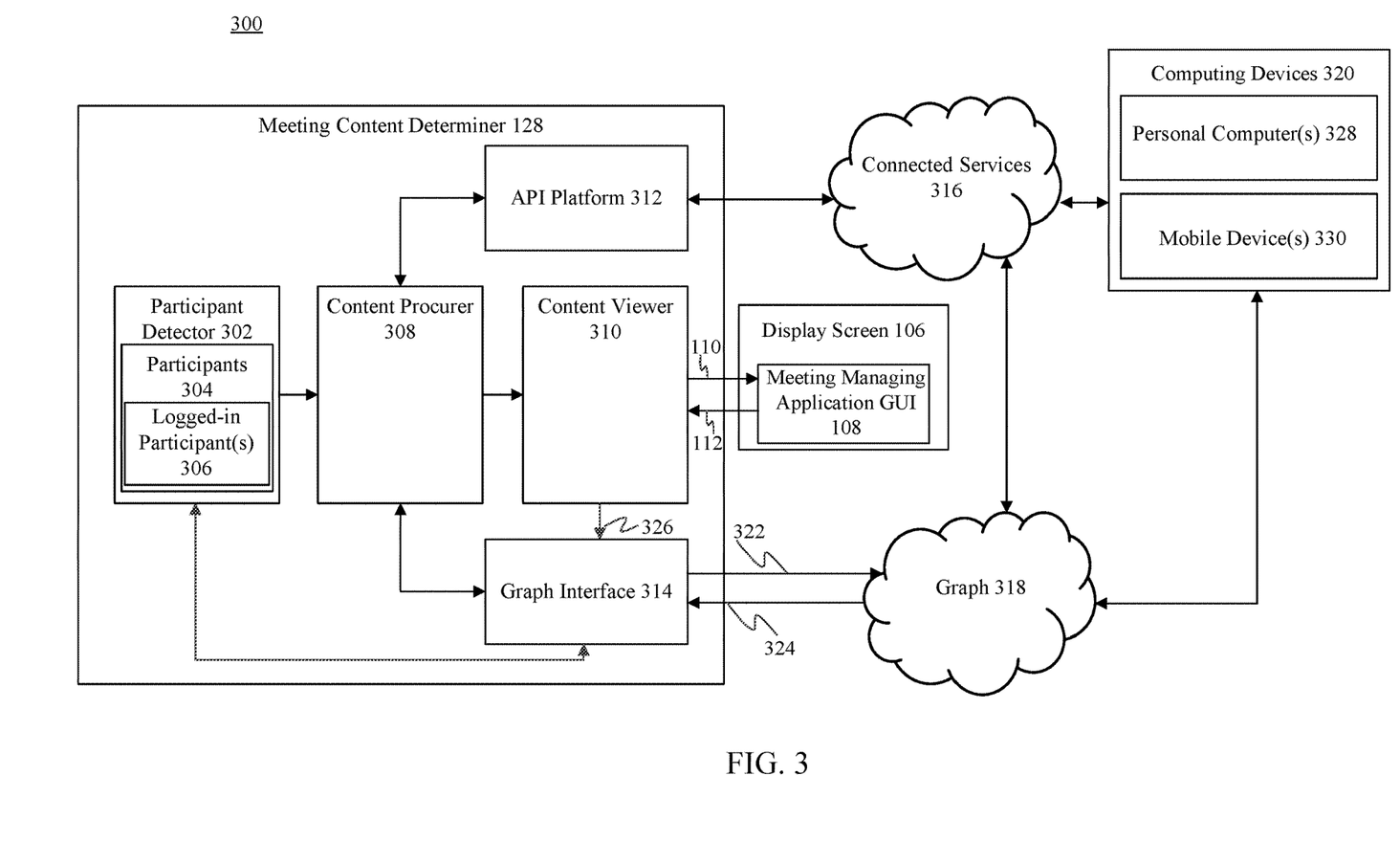
FIG. 3 shows a block diagram of a meeting content determiner in a meeting system, according to an example embodiment.

Meeting content determiner 128 may be configured in various ways to perform its functions. For instance, FIG. 3 shows a block diagram of meeting content determiner 128 in a meeting system 300, according to an example embodiment. As shown in FIG. 3, meeting system 300 includes display screen 106, meeting content determiner 128, one or more computing device(s) 320, one or more connected services 316, and a graph 318. Meeting content determiner 128 includes a participant detector 302, a content procurer 308, a content viewer 310, an API platform 312, and a graph interface 314. Meeting system 300 is an example of meeting system 100 of FIG. 1. The features of meeting system 300 are described in further detail as follows.

Participant detector 302 is configured to perform step 202 of FIG. 2. As such, in an embodiment, participant detector 302 is configured to identify a group including two or more participants in a meeting, which may have a context identified by one or more keywords. One or more of the identified participants of the group may be logged into an account associated with meeting managing application 104. In an embodiment, participant detector 302 is configured to generate and provide identified participant information 304 and logged-in participant information 306 to content procurer 308.

As shown in FIG. 3, content procurer 308 is communicatively coupled to API platform 312 and graph interface 314. Content procurer 308 is configured determine to determine and/or access content through API platform 312 at one or more connected services 316 (e.g., Microsoft® OneDrive®, Microsoft® SharePoint®, Microsoft® Exchange®, Microsoft® Teams, Slack®, Dropbox®). For example, API platform 312 may be configured to enable communications with one or more APIs provided at connected services 316 to enable content procurer 308 to send requests to, and receive responses from connected services 316. For example, a cloud service may be queried for content using a public facing API service. As shown in FIG. 3, content procurer 308 is further configured to receive weighted indications for the identified content from graph 318 through graph interface 314 (as further described with reference to FIG. 4 further below). As described with respect to step 202 (FIG. 2) above, content procurer 308 is configured to identify content (e.g., content 120 and/or 126 of FIG. 1) associated with the two or more participants (indicated by information 304 and/or 306) (and optionally with the one or more keywords) at one or more local applications (e.g., application 124 of FIG. 1) and/or remote applications (e.g., application 118 of FIG. 1), which may be connected services 316.

Content procurer 308 is configured to provide indications of the identified content to content viewer 310. Content viewer 310 is configured to display the indications of the identified content to one or more participants of the group. For example, content viewer 310 outputs identified content information 110 to meeting managing application GUI 108. As described above, identified content information 110 may include display indications (e.g., links to content, icon representations of content, snippets, etc.) of the identified content.

Content viewer 310 is configured to enable interaction by participants with identified content. For instance, content viewer 310 may receive input information 112 from GUI 108. For example, as described above, input information 112 may include directives (instructions) from a participant to open the identified content (e.g., by clicking on a link to the content). In an embodiment, content procurer 308 may open the content using public facing APIs associated with the source of the identified content. In other embodiments, content viewer 310 may open content in alternative ways.

Figure 4:
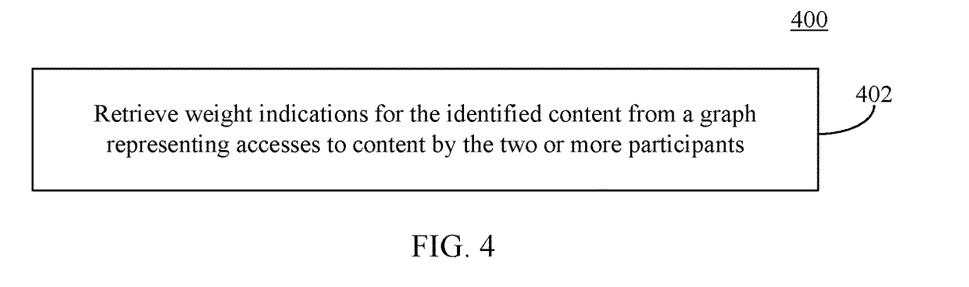
FIG. 4 shows a flowchart providing a process for weighting identified meeting content, according to an example embodiment.

Various flowcharts are described as follows to further clarify and illustrate embodiments. For instance, FIG. 4 shows a flowchart 400 providing a process for weighting identified meeting content, according to an embodiment. FIG. 4 is described with continued reference to FIG. 3. Other structural and operational embodiments will be apparent to persons skilled in the relevant art(s) based on the following discussion regarding flowchart 400 and system 300 of FIG. 3.

As shown in FIG. 4, flowchart 400 includes a step 402. In step 402, weight indications for the identified content are retrieved from a graph (e.g., an activity graph) that is a data structure indicating interactions between content and people, including indicating accesses to content by the users. For example, and with continued reference to FIG. 3, graph interface 314 of meeting content determiner 128 may retrieve content weight information 324 for the identified content from graph 318. Content weight information 324 stored in graph 318 is determined based on accesses to content by users, including the two or more identified participants. Graph interface 314 may retrieve content weight information for content associated with the two or more participants from graph 318, which may be stored locally or remotely, as described above.

In addition to accessing information in graph 318, graph interface 314 is configured to generate, maintain, and refine graph 318. In particular, graph interface 314 receives content access information 326 from content viewer 310, and may receive content access information from sources outside of meeting content determiner 128. Content access information 326 indicates accesses to content by users including the one or more participants. For instance, for an access by a user of a particular item of content, graph interface 314 may receive, in content access information 326, an indication of the accessing user, an indication of the accessed content, and an indication of the content source (e.g., application), as well as optional further information, such as a date/time of the access, a duration of the access, an identifier of a device used to access the content, keywords descriptive of the accessed content, a copy of the content itself, etc. Content access information 326 received from content viewer 310 indicates accesses of content displayed in GUI 108. Content access information indications may also be received from applications (e.g., applications 118 and 124) mentioned elsewhere herein or otherwise known, remote or local, that indicate accesses of associated content. For instance, in an embodiment, graph interface 314 may transmit an access information request (via API platform 312) to applications such as Google Docs™, Microsoft® Office 365, Dropbox®, etc., which may respond with an indication of accesses by one or more users (named in the request) of associated content.

Based on the received content access information, graph interface 314 generates graph 318. For instance, graph 318 may be generated to include a plurality of nodes, with a first set of nodes corresponding to content items and a second set of nodes corresponding to users. Edges may be generated to connect the nodes of the first set to nodes of the second set, with each node being generated to have a weight value indicative of a strength of relationship (i.e., an affiliation) between the content items and user. The greater the number of accesses of a particular content item by a user (and/or the greater the length of time spent accessing by the user), the greater the strength of relationship between the user and content items, and therefore the higher the weight value generated by graph interface 314. If a user has never accessed a particular content item, the edge connecting the corresponding nodes may be assigned a weight of zero. As shown in FIG. 3, graph interface 314 is configured to write graph information 322 to graph 318, which may include additional and/or deleted nodes, new and/or modified edge weight values, and/or further information related to graph 318.

Accordingly, graph 318 can be used to determine a strength of relationship between a single user and various content items, as well as a strength of relationship between a group of users, such as a group of meeting participants, and various content items. For instance, the weights on edges between multiple users and a single content item may be summed and/or otherwise combined to determine a strength of relationship between those users, as a group, and that particular content item.

As such, graph interface 314 is configured to receive requests from content procurer 308 for indications of content accessed by the one or more meeting participants. In response to such a request, graph interface 314 is configured to determine the content of graph 318 accessed by the users of the group (e.g., those content items having non-zero weights with one or more members of the group), to filter out any content items indicated as private, to combine the edge weights for any content items accessed by multiple participants, and to provide the determined weights for each accessed content item in content weight information 324 to content procurer 308.

Note that graph 318 may be refined by storing and tracking indications of content that the two or more participants access at any time, including during and/or after a meeting (e.g., based on the number of times the two or more participants accessed the content) received from computing device(s) 320 such as personal computer(s) 328 and mobile device(s) 330 of the participants, and indications of content accesses at connected services 316. For example, if any of the participants access the content from one of computing devices 320 during or after the meeting, graph 318 may be updated (e.g., adding nodes, removing nodes, adding edge weights, modifying edge weights, etc.) to reflect the access to the content by any of the participants. Further, graph 318 may be refined by storing and tracking indications of content that non-participants access via connected services 316. For example, if a non-participant accesses, creates, and/or modifies content associated with the one or more participants, graph 318 may be updated to reflect the access, creation, and/or modification of the content by the non-participant. As such, content managing application 104 is enabled to surface increasingly more relevant content for participants over time.

Figure 5:
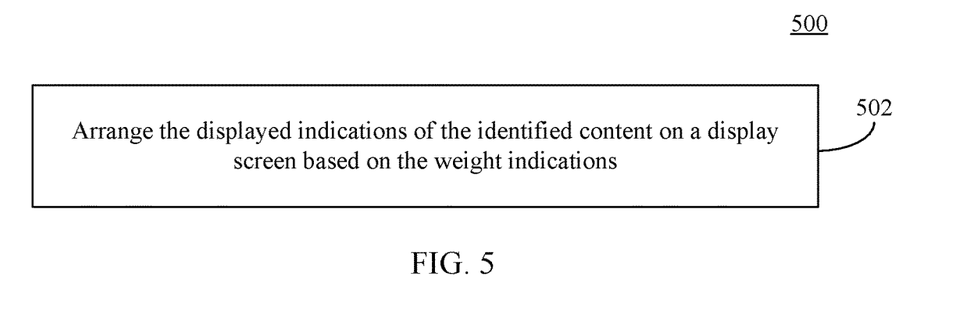
FIG. 5 shows a flowchart providing a process for arranging displayed indications of identified content, according to an example embodiment.

Content viewer 330 may be configured to arrange the display of content indications in various ways. For instance, FIG. 5 shows a flowchart 500 providing a process for arranging displayed indications of identified content, according to an embodiment. FIG. 5 is described with continued reference to FIG. 3. Other structural and operational embodiments will be apparent to persons skilled in the relevant art(s) based on the following discussion regarding flowchart 500 and system 300 of FIG. 3.

As shown in FIG. 5, flowchart 500 includes step 502. In step 502, displayed indications of the identified content are arranged on a display screen based on the weight indications. For example, and with continued reference to FIG. 3, content viewer 310 arranges the displayed indications of the identified content in GUI 108 based on the weight indications. For instance, content having higher weight indications may be displayed at a top of a list of content; whereas content having lower weight indications may be displayed at the bottom of the list of content, or not displayed at all (e.g., if having a group weight below a threshold value, if a predetermined number of content items are displayed, etc. In further examples, indications of the identified content may be displayed chronologically or by identified participants.

Figure 6:
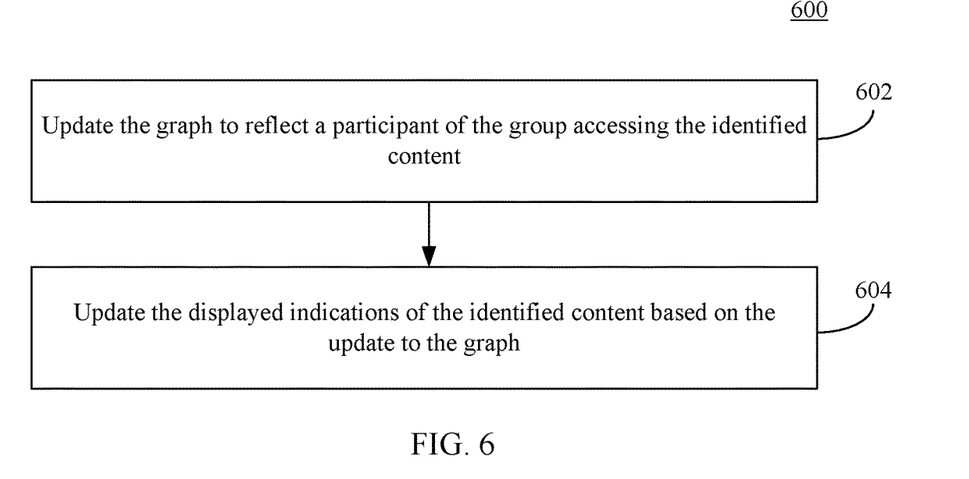
FIG. 6 shows a flowchart providing a process for updating a graph to reflect a participant of the group accessing content, according to an example embodiment.

As described above, in an embodiment, graph interface 314 may update graph 318 based on content accesses. For example, FIG. 6 shows a flowchart 600 providing a process for updating a graph to reflect a participant of the group accessing content, according to an example embodiment. FIG. 6 is described with continued reference to FIG. 3. Other structural and operational embodiments will be apparent to persons skilled in the relevant art(s) based on the following discussion regarding flowchart 600 and system 300 of FIG. 3.

As shown in FIG. 6, flowchart 600 begins at step 602. In step 602, the graph is updated to reflect a participant of the group accessing the identified content. For example, and with continued reference to FIG. 3, graph interface 314 updates the graph to reflect a participant of the group accessing the identified content. For example, content viewer 310 and/or other application is configured to provide graph interface 314 with access information relating to a user, such as a participant of the group, accessing the identified content, which graph interface 314 may use to update graph 318.

At step 604, the displayed indications of the identified content are updated based on the update to the graph. For example, and with continued reference to FIG. 3, content viewer 310 updates the displayed indications of the identified content based on the update to the graph. For example, following the update to graph 318, content viewer 310 receives information relating to the update to graph 318 from content procurer 310 and updates the displayed indications to reflect the update made to graph 318.

Figure 7:
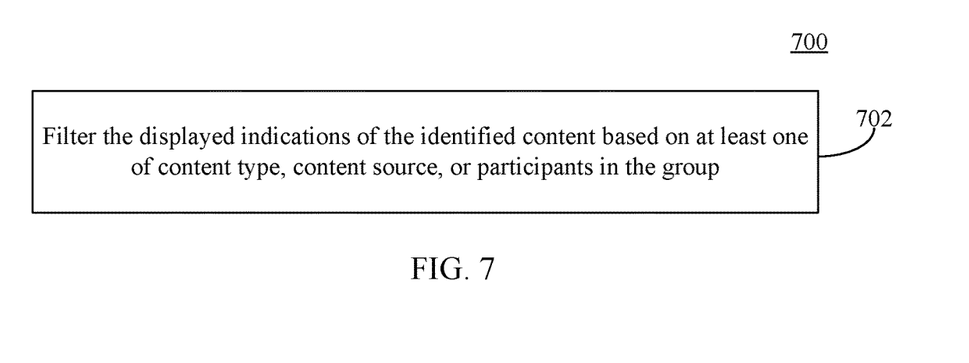
FIG. 7 shows a flowchart providing a process for filtering displayed indications of identified content, according to an example embodiment.

In an embodiment, content viewer 330 may filter and/or otherwise limit displayed indications of identified content. For example, FIG. 7 shows a flowchart 700 providing a process for filtering displayed indications of identified content, according to an example embodiment. FIG. 7 is described with continued reference to FIG. 3. Other structural and operational embodiments will be apparent to persons skilled in the relevant art(s) based on the following discussion regarding flowchart 700 and system 300 of FIG. 3.

As shown in FIG. 7, flowchart 700 includes step 702. In step 702, displayed indications of the identified content are filtered based on at least one of content type, content source, or participants in the group. For example, and with continued reference to FIG. 3, content viewer 310 filters the displayed indications of the identified content based on at least one of content type, content source, or participants in the group. As shown, content viewer receives input information 112 from GUI 108, such as a directive from a logged-in participant to only display content of a particular type (e.g., Microsoft® Word® file; based on file extension and/or other property), from a particular content source (e.g., a file management application such as Dropbox®, a messaging application, a news application, etc.), from a particular participant, etc. Content viewer 310 may output identified content information 110 to GUI 108 including display indications for only content of the specified particular type, specified source, specified participant, etc.

Figure 8:
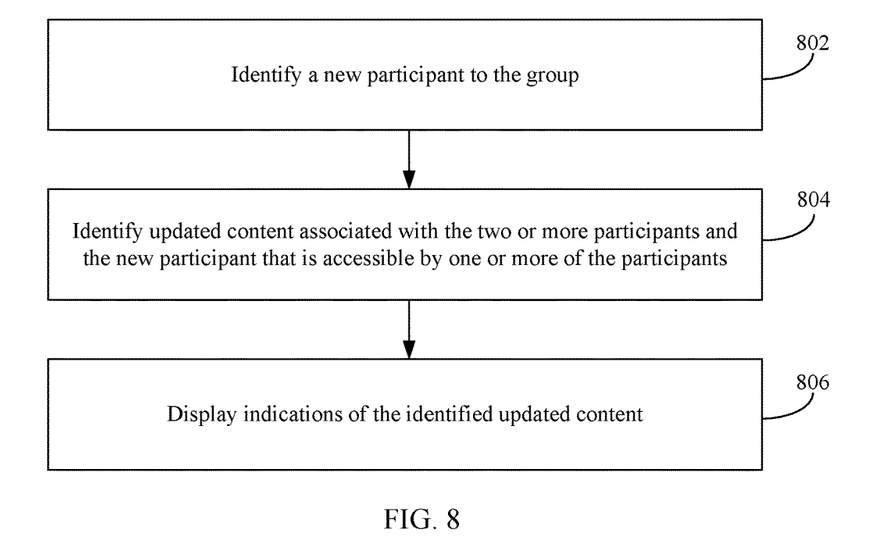
FIG. 8 shows a flowchart providing a process for identifying updated content based on a change of meeting participants, according to an example embodiment.

In an embodiment, content viewer 330 and/or content procurer 308 may update the displayed content indications based on meeting attendance. For example, FIG. 8 shows a flowchart 800 providing a process for identifying updated content based on a change of meeting participants, according to an example embodiment. FIG. 8 is described with continued reference to FIG. 3. Other structural and operational embodiments will be apparent to persons skilled in the relevant art(s) based on the following discussion regarding flowchart 800 and system 300 of FIG. 3.

As shown in FIG. 8, flowchart 800 starts at step 802. In step 802, a new participant to the group is identified. For example, and with continued reference to FIG. 3, participant detector 302 may identify a new participant to the group. For example, participant detector 302 may detect that a new person has entered the room in which the meeting is being held (and/or that a person left the meeting).

At step 804, updated content associated with the two or more participants and the new participant, and that is accessible by one or more of the participants is identified. For example, and with continued reference to FIG. 3, content procurer 308 identifies updated content associated with the two or more participants, and/or the new participant (and optionally with the one or more keywords) that is accessible by the at least one participant logged into the account. For instance, if the new participant is an active contributor in the group, the identified updated content may have little or no overlapping content with the previously identified content. On the other hand, if the new participant is a passive observer in the group, the identified updated content may be the same or similar to the previously identified content. In a similar manner, if a participant is detected to have left the meeting, updated content associated with the reduced set of participants (and optionally with one or more keywords), is determined, which may lead to a reduction in a total amount of identified content.

At step 806, indications of the identified updated content are displayed. For example, and with continued reference to FIG. 3, content viewer 310 displays indications of the identified updated content. For example, GUI 108 may be updated to display the identified updated content to the group.

Figure 9:
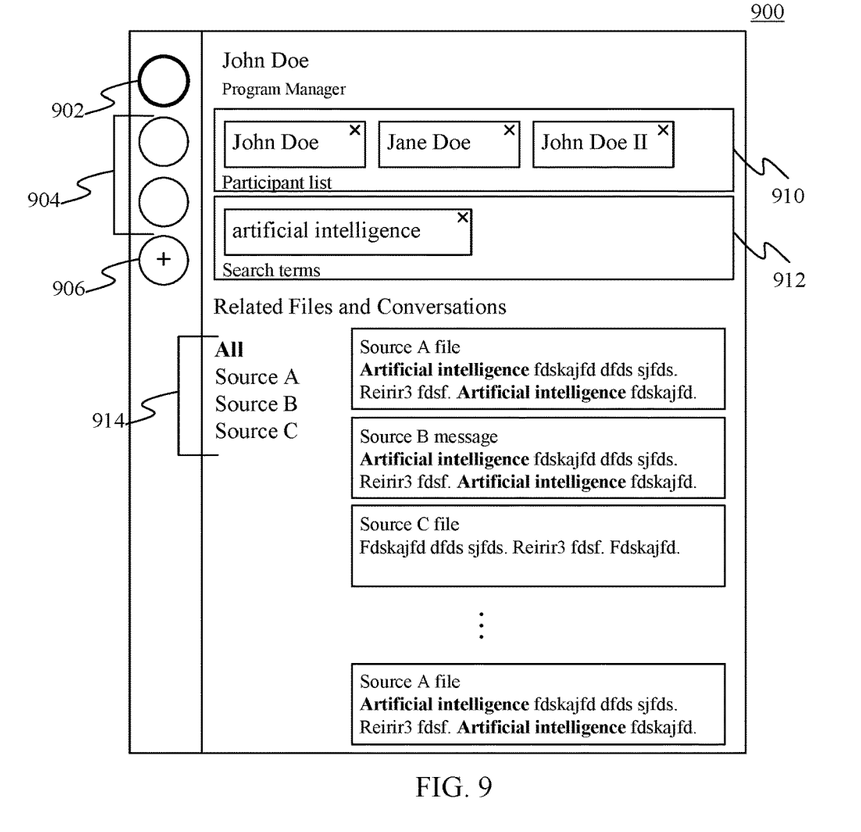
FIG. 9 shows an example graphical user interface (GUI) for managing meeting content, according to an example embodiment.

GUI 108 may be configured in any suitable manner, including one or more of any suitable user interface control or element, to display identified content to the participants, and to enable interaction with the identified content. For instance, FIG. 9 shows an example graphical user interface (GUI) 900 for managing meeting content, according to an example embodiment. GUI 900 is an example of GUI 108, and enables one or more participants of a meeting to search for and manage meeting content.

As shown in FIG. 9, GUI 900 includes a left column area including an interactive element 902 (e.g., a button), which represents a logged-in or authenticated participant, John Doe, in the meeting and a group of interactive elements 904 (e.g., buttons), which represent other participants, Jane Doe and John Doe II, in the meeting who are not logged in. Meeting content determiner 128 may have identified participants, John Doe, Jane Doe, and John Doe II, by the participants being included in a meeting invitation, by the participants logging into an account associated with meeting managing application 104, by a proximity of personal computing devices of the participants to shared computing device 102, by facial recognition, by voice recognition, and/or by any other personal recognition technology that may be used to identify participants of a meeting (e.g., in a same room). Note that in an embodiment, multiple participants may be simultaneously logged in. For instance, participants, Jane Doe and John Doe II, may log in by clicking on their corresponding interactive elements and entering a username or password into text entry boxes provided by GUI 900. Further participants may be automatically identified or manually added to the meeting by clicking interactive button 906 and entering a name into a text entry box provided by GUI 900. Participants may be removed/subtracted from the meeting in various ways, such as by interacting with their corresponding one of interactive elements (e.g., by right clicking a selecting "remove" from a pop-up menu, by selecting followed by pressing a delete key, etc.).

Meeting content determiner 128 may initiate a search for related content in an automatic manner, and may indications of the identified content in a content list 916. Identified content may be arranged in content list 916 in any manner, including in one or more columns, etc. Each content item may include an indicated content type, source of the content, and/or other content information. For example, the identified content may be represented in content list 916 by title, by hyperlink, by one or more keywords, by a snippet, and/or by any further identifying information.

Meeting content determiner 128 may also enable searches for related content a directed manner (including refinements of searches) based on user interaction with GUI 900. For instance, in a directed embodiment, GUI 900 may include a first text entry box 910 and a second text entry box 912. First text entry box 910 enables a participant to cause meeting content determiner 128 to search for content related to a set of participants listed in first text entry box 910, which may include all or a subset of the participants in the meeting (e.g., shown in the left column area of GUI 900). The participants may search for content associated with the participants by entering names into text entry box 910. In addition, content associated with one of the participants may be removed or reduced in weight by deleting a name of the participant from text entry box 910. Second text entry box 912 enables searches to be performed on specified content sources (e.g., source A, source B, source C) for content having attributes that match one or more entered keywords. For instance, as shown in FIG. 9, a participant entered the keywords "artificial intelligence" into text entry box 912. As such, content in content list 916 that include this keyword string may be highlighted in any manner (e.g., bolded, shown in a particular color, etc.). Alternatively, the keywords "artificial intelligence" may have been automatically identified from a title and/or body of a meeting invitation, by being spoken by the participants, from keywords of a prior meeting that included the participants, from a comparison of account profile information for the participants, and/or entered into text entry box 912 in other ways.

As shown in FIG. 9, a group of interactive elements 914 (e.g., buttons) may be present in GUI 900 for use by participants to filter content by content source. For example, the participants can select interactive element "All" of interactive elements 914 to display identified content from all sources A, B, and C, or may select interactive element "Source B" of second group of interactive elements 914 to limit display to messages between the participants from Source B. Sources A, B, and C may each be a local or remote application, such as application 124 and/or application 118.

Note that the indications of the content objects may be ordered in content list 916 based on the corresponding weight indications retrieved from graph 318, as described above. The greater the strength of relationship between the participants and the content objects, the higher the weight value assigned to the content objects. Content having higher weight indications may be displayed at or near a top of content list 916. Similarly, the lower the strength of relationship between the participants and the content objects, the lower the weight value assigned to the content objects. Content having relatively lower weight indications may be displayed at or near a bottom of content list 916.

As described above, when a new participant enters a meeting area or otherwise joins the meeting, the displayed indication of content objects in content list 916 may be updated based on the new participant. For example, graph 318 can be used to determine a new strength of relationship between the participants and the new participant and various content items. Updated content associated with the keywords "artificial intelligence", the participants, and the new participant, may be identified and indications of the updated content may be displayed on GUI 900. Similarly, when an existing participant leaves the meeting area or otherwise leaves the meeting, the displayed indication of content objects in content list 916 may be updated based on the departing participant.

Note that embodiments have various advantages, including the automatic identification and presentation of more relevant content to meeting participants, as well as the ability to refine the identified content based on changes to the meeting participants, and/or various other filters. Participants are saved the time and effort of manually searching for and presenting relevant content, as well as initiating meeting more quickly. Computing resources may be saved, such as processor bandwidth and memory utilization, by storing portions of identified content (e.g., links, titles, snippets, source names, etc.) rather than entire content item files, at least until an entire content item is retrieved by a participant by interacting with the link. As such, smaller portions of potentially large content lists may be maintained in memory. Furthermore, graph 318 is a concise data structure for maintaining relationship information, including weights, for users and content items.

Embodiments further enable "picking up where we left off" for meetings. In other words, participants are enabled to quickly get back into the context of what they were working on and/or discussing to be as productive as possible. Embodiments unlock important content from any suitable source, including information locked in conversations such as in email, text messages, and instant messages, as well as documents.

III. Example Computer System Implementation

Shared computing device 102, server 116, meeting managing application 104, meeting managing application GUI 108, meeting content determiner 128, participant detector 302, content procurer 308, content viewer 310, API platform 312, graph interface 314, flowchart 200, flowchart 400, flowchart 500, flowchart 600, flowchart 700, and flowchart 800 may be implemented in hardware, or hardware combined with software and/or firmware. For example, Shared computing device 102, server 116, meeting managing application 104, meeting managing application GUI 108, meeting content determiner 128, participant detector 302, content procurer 308, content viewer 310, API platform 312, graph interface 314, flowchart 200, flowchart 400, flowchart 500, flowchart 600, flowchart 700, and flowchart 800 may be implemented as computer program code/instructions configured to be executed in one or more processors and stored in a computer readable storage medium. Alternatively, shared computing device 102, server 116, meeting managing application 104, meeting managing application GUI 108, meeting content determiner 128, participant detector 302, content procurer 308, content viewer 310, API platform 312, graph interface 314, flowchart 200, flowchart 400, flowchart 500, flowchart 600, flowchart 700, and flowchart 800 may be implemented as hardware logic/electrical circuitry.

For instance, in an embodiment, one or more, in any combination, of meeting managing application 104, meeting managing application GUI 108, meeting content determiner 128, participant detector 302, content procurer 308, content viewer 310, API platform 312, graph interface 314, flowchart 200, flowchart 400, flowchart 500, flowchart 600, flowchart 700, and flowchart 800 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 10:
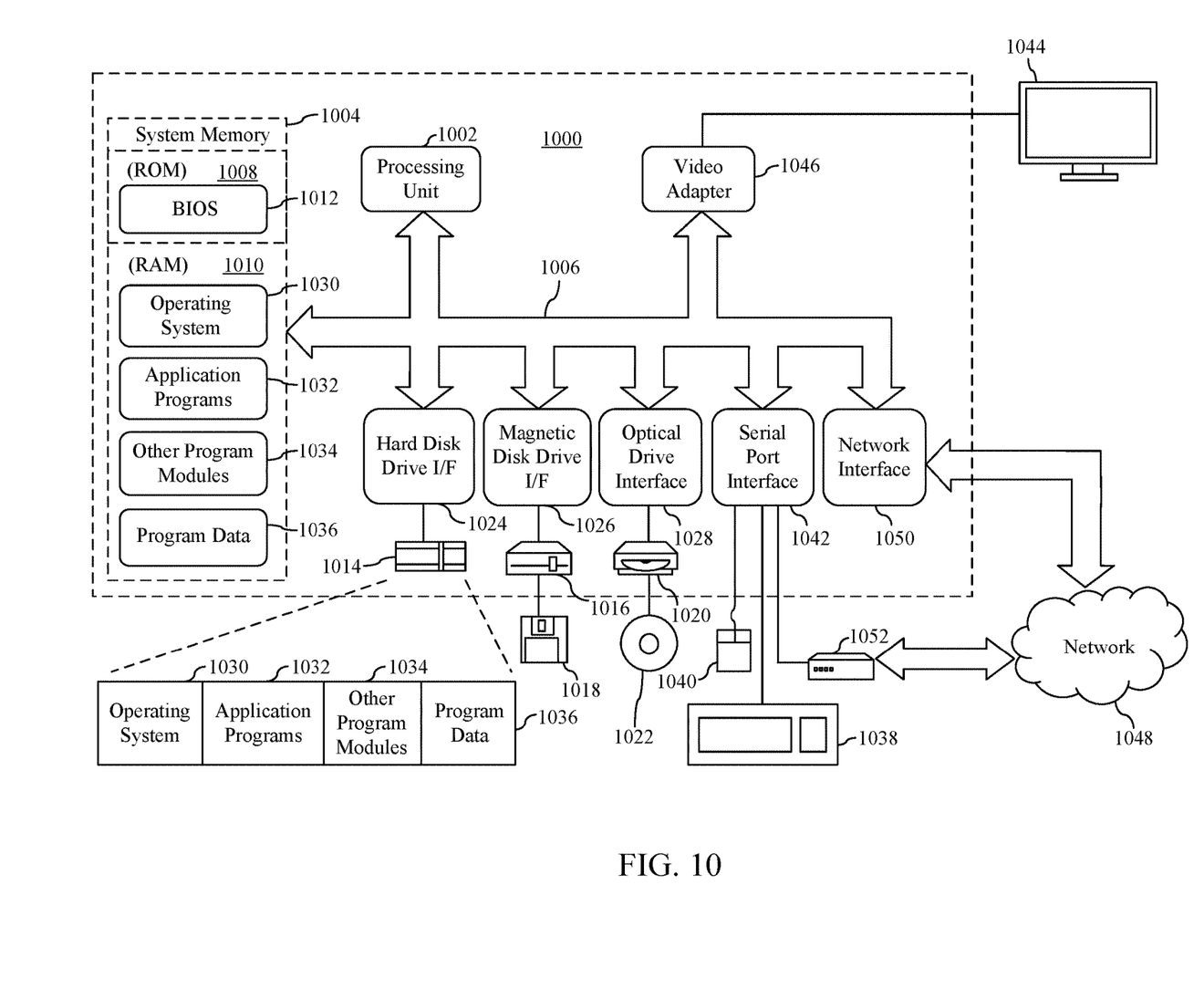
FIG. 10 shows a block diagram of an example processor-based computer system that may be used to implement various embodiments.

FIG. 10 depicts an exemplary implementation of a computing device 1000 in which embodiments may be implemented. For example, shared computing device 102, server 116, and/or meeting managing application 104 may each be implemented in one or more computing devices similar to computing device 1000 in stationary or mobile computer embodiments, including one or more features of computing device 1000 and/or alternative features. The description of computing device 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing meeting managing application 104, meeting managing application GUI 108, meeting content determiner 128, participant detector 302, content procurer 308, content viewer 310, API platform 312, graph interface 314, flowchart 200, flowchart 400, flowchart 500, flowchart 600, flowchart 700, and/or flowchart 800 (including any suitable step of flowcharts 200, 600, 800), and/or further embodiments described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

In a first embodiment, a method in a meeting managing application in a shared computing device, comprises: identifying a group including two or more participants in a meeting, at least one participant of the group logged into an account associated with the meeting managing application; identifying content associated with the two or more participants, and accessible by the at least one participant logged into the account; and displaying indications of the identified content to one or more participants of the group.

In an embodiment, said identifying the content comprises: retrieving weight indications for the identified content from a graph representing accesses to content by the two or more participants.

In an embodiment, said displaying comprises: arranging the displayed indications of the identified content on a display screen based on the weight indications.

In an embodiment, the method further comprises: updating the graph to reflect a participant of the group accessing the identified content; and updating the displayed indications of the identified content based on the update to the graph.

In an embodiment, the identified content includes at least one of email communications or chat conversations between one or more participants in the group.

In another embodiment, the method further comprises: filtering the displayed indications of the identified content based on at least one of content type, content source, or participants in the group.

In an embodiment, the method further comprises: identifying a new participant to the group; identifying updated content associated the two or more participants, and the new participant that is accessible by the at least one participant logged into the account; and displaying indications of the identified updated content.

In another embodiment, a meeting managing application in a shared computing device, comprises: a participant detector configured to identify a group including two or more participants in a meeting, at least one participant of the group logged into an account associated with the meeting managing application a content procurer configured to identify content associated with the two or more participants, and accessible by the at least one participant logged into the account; and a content viewer configured to display indications of the identified content to one or more participants of the group.

In an embodiment, the content procurer is further configured to retrieve weight indications for the identified content from a graph representing accesses to content by the two or more participants.

In an embodiment, the content viewer is further configured to arrange the displayed indications of the identified content on a display screen based on the weight indications.

In an embodiment, the content procurer is further configured to update the graph to reflect a participant of the group accessing the identified content, and the content viewer is further configured to update the display of the indications of the identified content based on the update to the graph.

In an embodiment, the identified content includes at least one of email communications or chat conversations between one or more participants in the group.

In an embodiment, the content viewer is further configured to filter the displayed indications of the identified content based on at least one of content type, content source, or participants in the group.

In an embodiment, the participant detector is further configured to identify a new participant to the group, and the content procurer is further configured to identify updated content associated with the two or more participants, and the new participant that is accessible by the at least one participant logged into the account. Further, the content viewer is further configured to display indications of the identified updated content.

In another embodiment, a computer-readable storage medium having program instructions recorded thereon that, when executed by at least one processing circuit of a shared computing device, perform a method, comprises: identifying a group including two or more participants in a meeting, at least one participant of the group logged into an account associated with the meeting managing application; identifying content associated with the two or more participants, and accessible by the at least one participant logged into the account; displaying indications of the identified content to one or more participants of the group.

In an embodiment, the method further comprises: retrieving weight indications for the identified content from a graph representing accesses to content by the two or more participants.

In an embodiment, said displaying comprises: arranging the displayed indications of the identified content on a display screen based on the weight indications.

In an embodiment, the method further comprises: updating the graph to reflect a participant of the group accessing the identified content; and updating the displayed indications of the identified content based on the update to the graph.

In an embodiment, the identified content includes at least one of email communications or chat conversations between one or more participants in the group.

In an embodiment, the method further comprises: filtering the displayed indications of the identified content based on at least one of content type, content source, or participants in the group.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A shared computing device, comprising:
   a processor circuit,
   one or more memory devices communicatively connected to the processor circuit that store computer program instructions for execution thereby, the computer program instructions comprising:
      a meeting content determiner, comprising:
         a participant detector configured to identify participants in a meeting, at least one participant of the participants logged into an account associated with the meeting content determiner;
         a content procurer configured to identify content that multiple of the participants have interacted with and that is accessible by the at least one participant logged into the account and identify updated content based on interactions occurring during the meeting that the participants have with the identified content or interactions during the meeting that multiple of the participants have with unidentified content; and
         a content viewer configured to display indications of the identified content and the updated content to one or more of the participants.

2. The shared computing device of claim 1, wherein the content procurer is further configured to retrieve weight indications for the identified content from a graph representing accesses to content by the participants.

3. The shared computing device of claim 2, wherein the content viewer is further configured to arrange the displayed indications of the identified content on a display screen based on the weight indications.

4. The shared computing device of claim 2, wherein:
   the content procurer is further configured to update the graph to reflect a participant accessing the identified content; and
   the content viewer is further configured to update the display of the indications of the identified content based on the update to the graph.

5. The shared computing device of claim 1, wherein the identified content includes at least one of email communications or chat conversations between one or more participants.

6. The shared computing device of claim 1, wherein the content viewer is further configured to filter the displayed indications of the identified content based on at least one of content type, content source, or the participants.

7. The shared computing device of claim 1, wherein:
   the participant detector is further configured to identify a new participant in the meeting;
   the content procurer is further configured to identify updated content associated with the participants and the new participant that is accessible by the at least one participant logged into the account; and
   the content viewer is further configured to display indications of the identified updated content.

8. A method in a meeting managing application in a shared computing device, comprising:
   identifying participants in a meeting, at least one participant of the participants logged into an account associated with the meeting managing application;
   identifying content that multiple of the participants have interacted with, and that is accessible by the at least one participant logged into the account;
   identifying updated content based on interactions occurring during the meeting that the participants have with the identified content or interactions during the meeting that multiple of the participants have with unidentified content; and
   displaying indications of the identified content and the updated content to one or more of the participants.

9. The method of claim 8, wherein said identifying the content comprises:
   retrieving weight indications for the identified content from a graph representing accesses to content by the participants.

10. The method of claim 9, wherein said displaying comprises:
    arranging the displayed indications of the identified content on a display screen based on the weight indications.

11. The method of claim 9, further comprising:
    updating the graph to reflect a participant accessing the identified content; and
    updating the displayed indications of the identified content based on the update to the graph.

12. The method of claim 8, wherein the identified content includes at least one of email communications or chat conversations between one or more participants.

13. The method of claim 8, further comprising:
    filtering the displayed indications of the identified content based on at least one of content type, content source, or the participants.

14. The method of claim 8, further comprising:
    identifying a new participant in the meeting;
    identifying updated content associated the participants and the new participant that is accessible by the at least one participant logged into the account; and
    displaying indications of the identified updated content.

15. A computer-readable storage medium having program instructions recorded thereon that, when executed by at least one processing circuit of a shared computing device, perform a method, comprising:
- identifying participants in a meeting, at least one participant of the participants logged into an account associated with a meeting managing application;
- identifying content that multiple of the participants have interacted with, and that is accessible by the at least one participant logged into the account;
- identifying updated content based on interactions occurring during the meeting that the participants have with the identified content or interactions during the meeting that multiple of the participants have with unidentified content; and
- displaying indications of the identified content and the updated content to one or more of the participants.

16. The computer-readable storage medium of claim 15, wherein the method further comprises:
- retrieving weight indications for the identified content from a graph representing accesses to content by the participants.

17. The computer-readable storage medium of claim 16, wherein said displaying comprises:
- arranging the displayed indications of the identified content on a display screen based on the weight indications.

18. The computer-readable storage medium of claim 16, wherein the method further comprises:
- updating the graph to reflect a participant accessing the identified content; and
- updating the displayed indications of the identified content based on the update to the graph.

19. The computer-readable storage medium of claim 15, wherein the identified content includes at least one of email communications or chat conversations between one or more participants.

20. The computer-readable storage medium of claim 15, wherein the method further comprises:
- filtering the displayed indications of the identified content based on at least one of content type, content source, or the participants.

* * * * *